US008589352B2

(12) United States Patent
Matsubara et al.

(10) Patent No.: US 8,589,352 B2
(45) Date of Patent: Nov. 19, 2013

(54) FEDERATED CONFIGURATION MANAGEMENT DATABASE, MANAGEMENT DATA REPOSITORY, AND BACKUP DATA MANAGEMENT SYSTEM

(75) Inventors: Masazumi Matsubara, Kawasaki (JP); Yuji Wada, Kawasaki (JP); Yasuhide Matsumoto, Kawasaki (JP); Yukihiro Watanabe, Kawasaki (JP); Kuniaki Shimada, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/886,744

(22) Filed: Sep. 21, 2010

(65) Prior Publication Data

US 2011/0016092 A1 Jan. 20, 2011

Related U.S. Application Data

(63) Continuation of application No. PCT/JP2008/056400, filed on Mar. 31, 2008.

(51) Int. Cl.
*G06F 17/30* (2006.01)

(52) U.S. Cl.
USPC ........... 707/645; 707/646; 707/647; 707/648; 707/649; 707/650; 707/651; 707/652; 707/653

(58) Field of Classification Search
USPC ........................................................ 707/640
See application file for complete search history.

(56) References Cited

U.S. PATENT DOCUMENTS

| 7,529,785 | B1 * | 5/2009 | Spertus et al. ........................ 1/1 |
| 7,596,570 | B1 * | 9/2009 | Emigh et al. ........................... 1/1 |
| 2004/0073677 | A1 * | 4/2004 | Honma et al. ................. 709/226 |
| 2005/0216788 | A1 * | 9/2005 | Mani-Meitav et al. ........... 714/6 |
| 2006/0179085 | A1 | 8/2006 | Kaijima et al. |
| 2007/0078972 | A1 | 4/2007 | Yagishita |
| 2008/0162846 | A1 * | 7/2008 | Kodama ......................... 711/162 |

FOREIGN PATENT DOCUMENTS

| JP | 9-305455 | 11/1997 |
| JP | 2003-296167 | 10/2003 |
| JP | 2005-092282 | 4/2005 |
| JP | 2006-004229 A | 1/2006 |
| JP | 2006-079389 | 3/2006 |
| JP | 2006-79389 A | 3/2006 |
| JP | 2006-215868 A | 8/2006 |
| JP | 2006-350470 | 12/2006 |
| JP | 2007-102452 A | 4/2007 |

OTHER PUBLICATIONS

International Search Report issued in Int'l. App. No. PCT/JP2008/056400, mailed May 13, 2008.

(Continued)

*Primary Examiner* — Baoquoc N To
(74) *Attorney, Agent, or Firm* — Greer, Burns & Crain, Ltd.

(57) ABSTRACT

A federated configuration management database includes a plurality of management data repositories, and a backup destination determination unit that determines backup destination management data repositories for backing up data overlapping among the plurality of management data repositories at specific management data repositories and that notifies each of the management data repositories of the data to be backed up.

8 Claims, 14 Drawing Sheets

(56) References Cited

OTHER PUBLICATIONS

Yasutaka Taniuchi et al.; "Platforms for Unifying Data Center Information"; Fujitsu, Jan. 10, 2008, vol. 59, No. 1, pp. 45-49.
Forest Carlisle et al.; CMDB Federation, Committee Draft; Ver. 1.0, Oct. 22, 2007, pp. 1-84.

Notice of Reasons for Rejection (with Partial Translation) mailed Apr. 17, 2012 from corresponding Japanese Patent Application No. 2010-505187.
Notice of Reasons for Rejection (with Translation) mailed Mar. 12, 2013 from corresponding Japanese Patent Application No. 2010-505187.

* cited by examiner

FIG.7

| GLOBAL ID OF DATA | MDR'S HOLDING DATA AND LOCAL ID | BACKUP MDR |
|---|---|---|
| SERVER 1 | CONFIGURATION MANAGEMENT MDR:svr1, DESIGN INFORMATION MDR:NODE 1 | CONFIGURATION MANAGEMENT MDR |
| SERVER 2 | CONFIGURATION MANAGEMENT MDR:svr3, DESIGN INFORMATION MDR:NODE 5, PERFORMANCE INFORMATION MDR:SV2 | CONFIGURATION MANAGEMENT MDR |
| SWITCH 1 | DESIGN INFORMATION MDR:SWITCH A, PERFORMANCE INFORMATION MDR:SW2 | PERFORMANCE INFORMATION MDR |
| MIDDLEWARE A | DESIGN INFORMATION MDR:App9, SOFTWARE INFORMATION MDR:SW3, PERFORMANCE INFORMATION MDR:SOFTWARE AAA | SOFTWARE INFORMATION MDR |
| ... | | |

(DATA MAPPING INFORMATION)

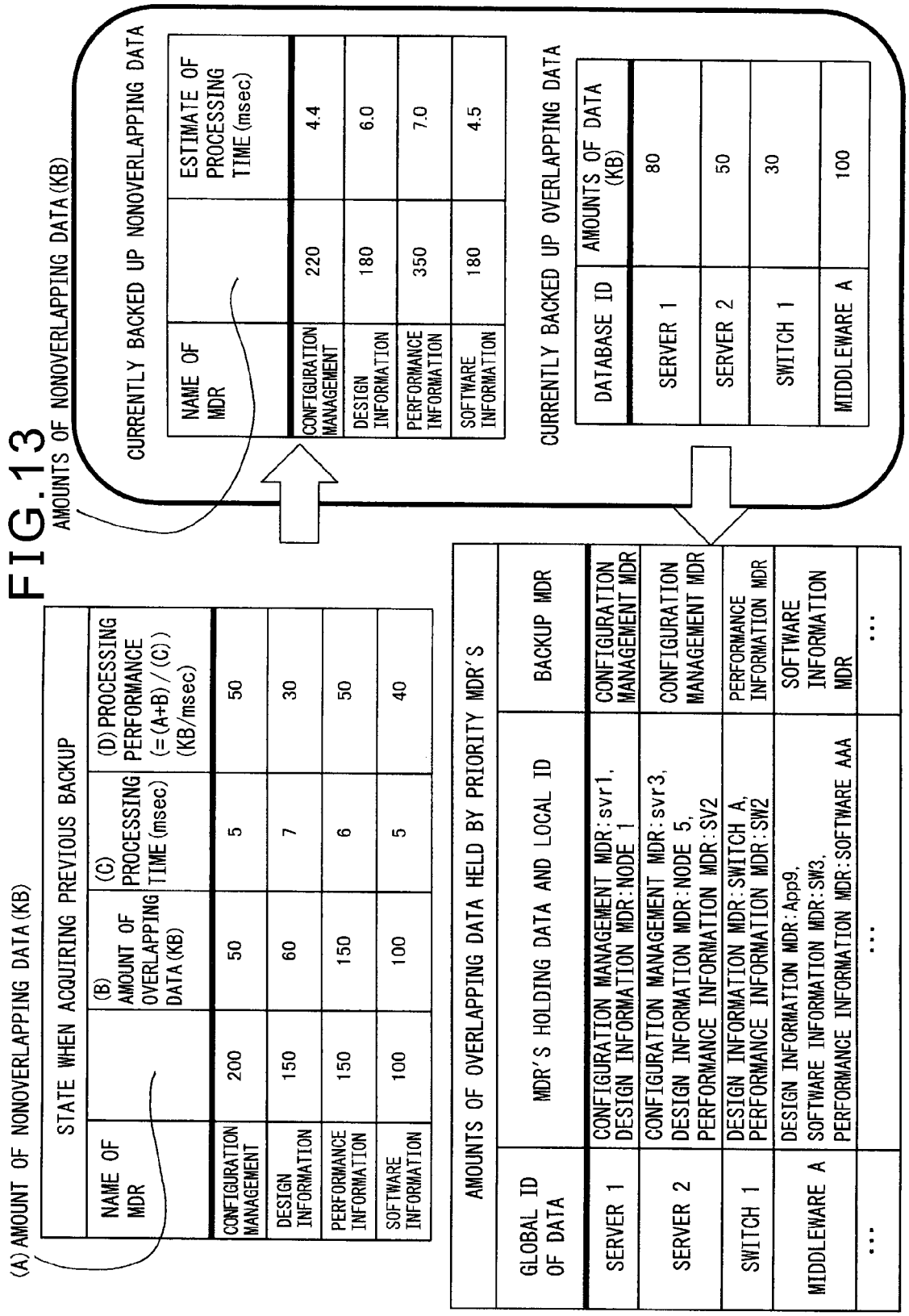

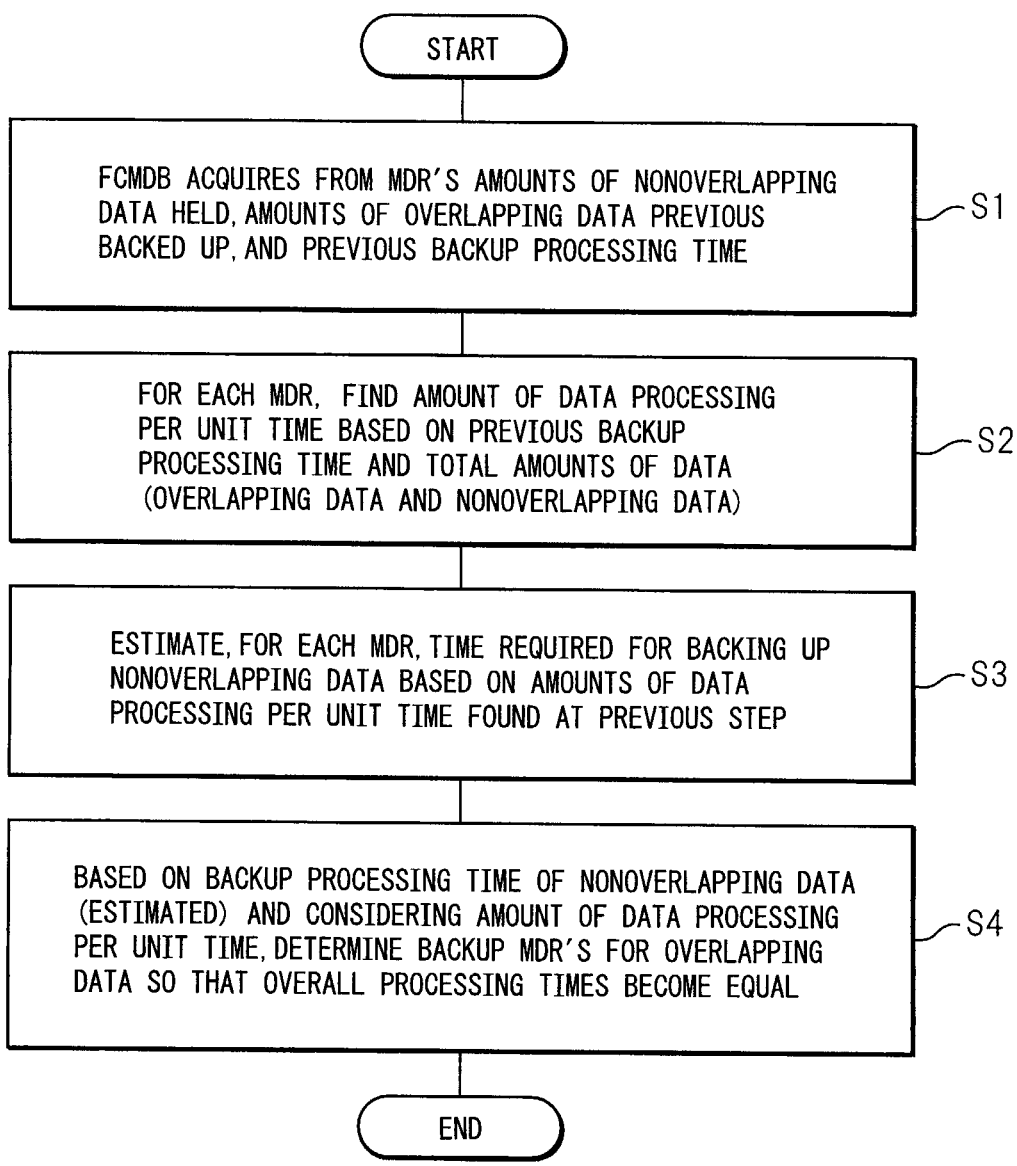

FEDERATED CONFIGURATION MANAGEMENT DATABASE, MANAGEMENT DATA REPOSITORY, AND BACKUP DATA MANAGEMENT SYSTEM

CROSS-REFERENCE TO RELATED APPLICATION

This application is a continuation application and is based upon PCT/JP2008/056400, filed on Mar. 31, 2008, the entire contents of which are incorporated herein by reference.

FIELD

The embodiments relate to a federated configuration management database (FCMDB) having a reconciliation function, which federated configuration management database disperses and manages backup data among a plurality of management data repositories (MDRs) managed by the FCMDB, and a backup data management method and a program for the same.

BACKGROUND

FIG. 1 is a view illustrating a system for management of MDRs by an FCMDB for explaining the basic functions of the FCMDB. The FCMDB is a database integrating a plurality of management data repositories all together, while an MDR is an individual component management device in the system. The FCMDB 10 can retrieve data stored in a plurality of integrated MDRs 11 to 16 in a crossover manner. The MDRs 11 to 16 manage configuration information, incident information, trouble information, release information, change information, application information, and other information (items) relating to managed resources and the relationships among these items. The FCMDB 10 manages data reconciling items and relationships held by the individual MDR and the relationships 10A between items stored in different MDRs. The FCMDB 10 receives search requests from outside computers or an input device of FCMDB 10 and draws out search results from the plurality of MDRs 11 to 16 for response.

FIG. 2 is a view illustrating a system for management of MDRs by the FCMDB for explaining the reconciliation function of the FCMDB. The FCMDB 20 of FIG. 2 has the same functions as the FCMDB 10 of FIG. 1. The FCMDB 20 can retrieve data stored in the plurality of integrated MDRs 21 to 26 in a crossover manner and has a function to integrate information. The integration of information by the FCMDB 20 is made possible by the following two functions.

First function: Standardization of names of types of items managed by names such as server, host or nodes differing for the different MDRs (data format standardization function). For example, as illustrated in the first line of the reconciliation information 20A, the name is standardized to "server".

Second function: Integration of information of same item managed by local IDs such as Webserver 1, 192.168.10.1 or hostnameX differing for the different MDRs (reconciliation function). This function is realized by laying down rules for identifying items for each type of item in advance and integrating information of matching items among the items of the same type in accordance with those rules.

FIG. 3 is a view illustrating a system for management of MDRs by an FCMDB for explaining a backup/restoring function in a conventional FCMDB. In a conventional FCMDB 30, each of a plurality of MDRs 31 to 33 has a backup/restoring function. The FCMDB 30 prevents non-reconciliation by synchronizing the MDRs 31 to 33, then starting the backup of data at the individual MDRs all at once. Further, the FCMDB 30 makes the MDRs 31 to 33 restore data all at once or makes only the MDRs desired for restore data individually.

A method of giving each of the dispersed databases a backup (backup storage unit) and virtually integrating them in a single database is disclosed (see PLT 1).

A method of suitably selecting part of a plurality of storage devices required for maintaining the consistency of a database stored dispersed among the storage devices, efficiently generating the backup for the part, starting the backup of the part all at once and ending it all at once, and during the time causing transactions being processed at the concerned database to be completed and prohibiting further transactions is disclosed (see PLT 2).

However, in the methods described in PLTs 1 and 2, the backup is performed while maintaining the consistency for the system as a whole, so it is necessary to secure a sufficient backup region in each MDR. For this reason, there was the problem of the enlarged storage capacity of each MDR (backup storage unit).

Further, in an FCMDB environment, the amount of data held at each MDR and the backup/restore performance, that is, the processing speed (amount of data backup/restore per unit time), differed for each MDR, so the time required for backup/restore varies. Therefore, management of conventional backup data under an FCMDB environment required matching with the MDR with the slowest processing speed. A great amount of time was required until completion of backup/restore, so there is an issue of inefficiency.

PLT 1: Japanese Laid-Open Patent Publication No. 9-305455
PLT 2: Japanese Laid-Open Patent Publication No. 2006-215868
NPL 3: CMDB Federation (CMDBf) Committee Draft Version 1.0, 22 Oct. 2007

SUMMARY

According to an aspect of the invention, a federated configuration management database includes a plurality of management data repositories, and a backup destination determination unit that determines backup destination management data repositories for backing up data overlapping among the plurality of management data repositories at specific management data repositories and that notifies each of the management data repositories of the data to be backed up.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view illustrating a table storing information on backup MDRs.

FIG. 13 is a view illustrating a third example of determination of backup MDRs.

FIG. 14 is a flow chart of a third method of determination of backup MDRs.

DESCRIPTION OF EMBODIMENTS

Figure 1:
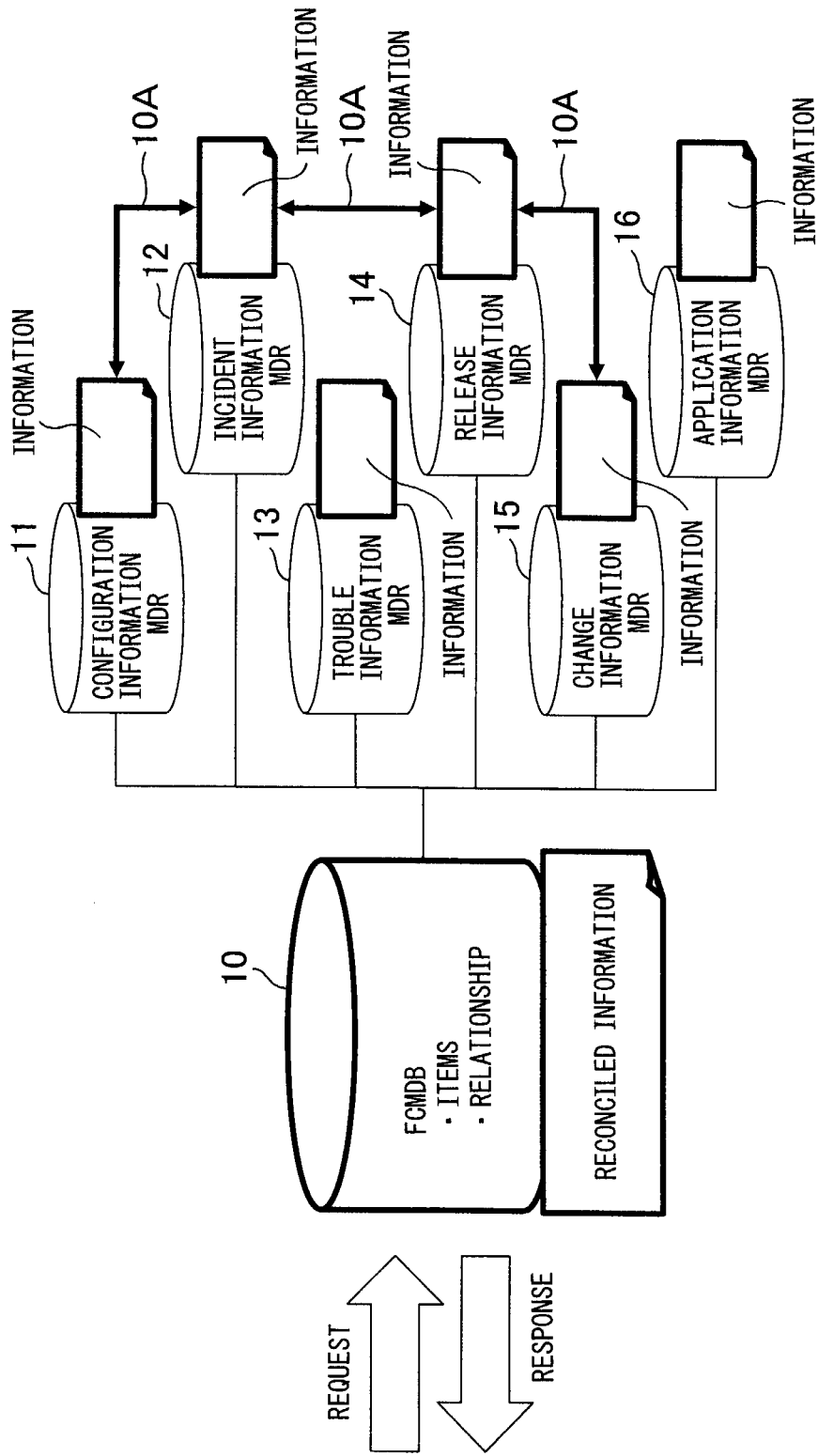
FIG. 1 is a view illustrating a system for management of MDRs by an FCMDB for explaining the basic functions of an FCMDB (prior art).
Figure 2:
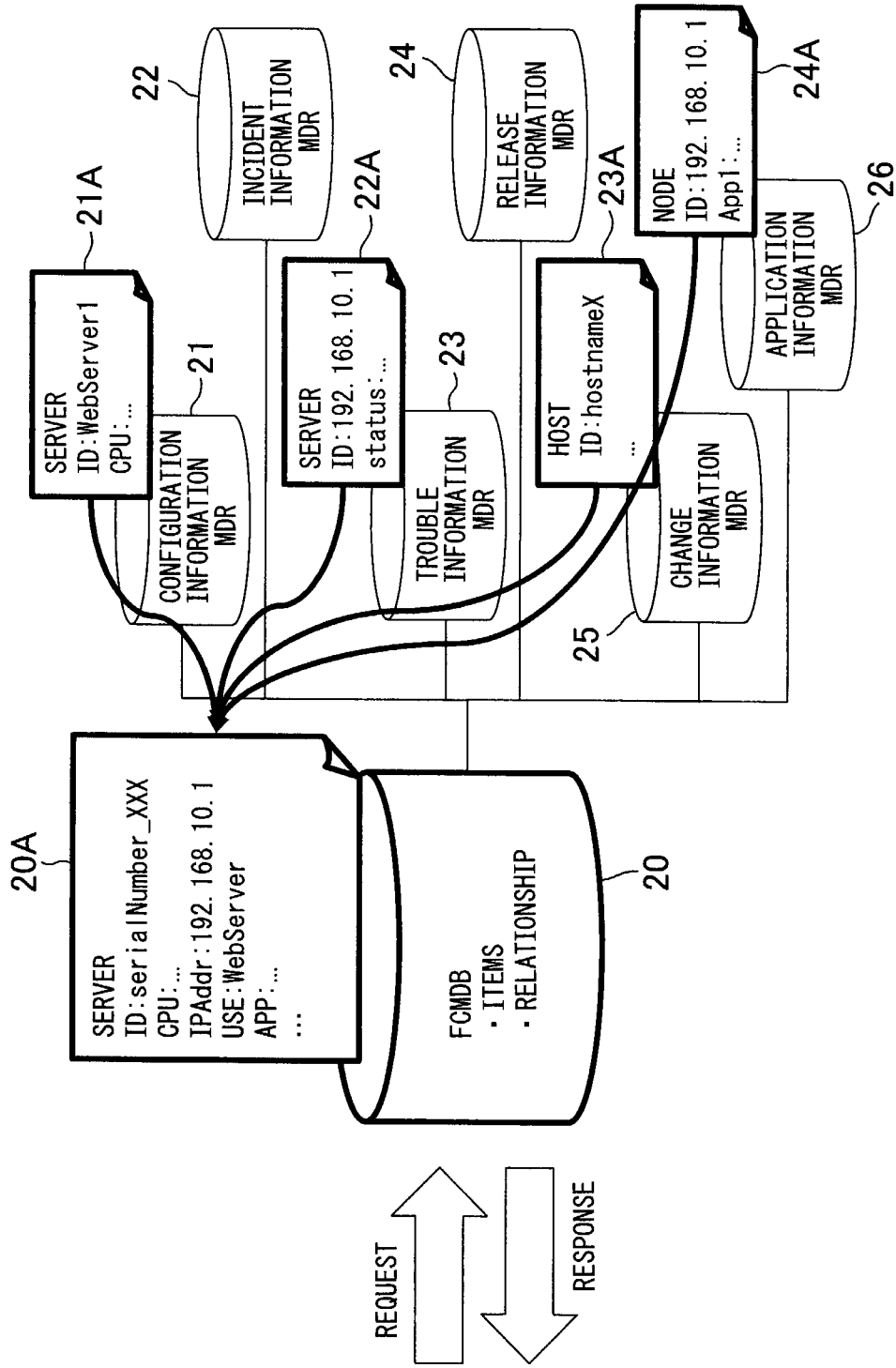
FIG. 2 is a view illustrating a system for management of MDRs by an FCMDB for explaining the reconciliation function of an FCMDB (prior art).
Figure 3:
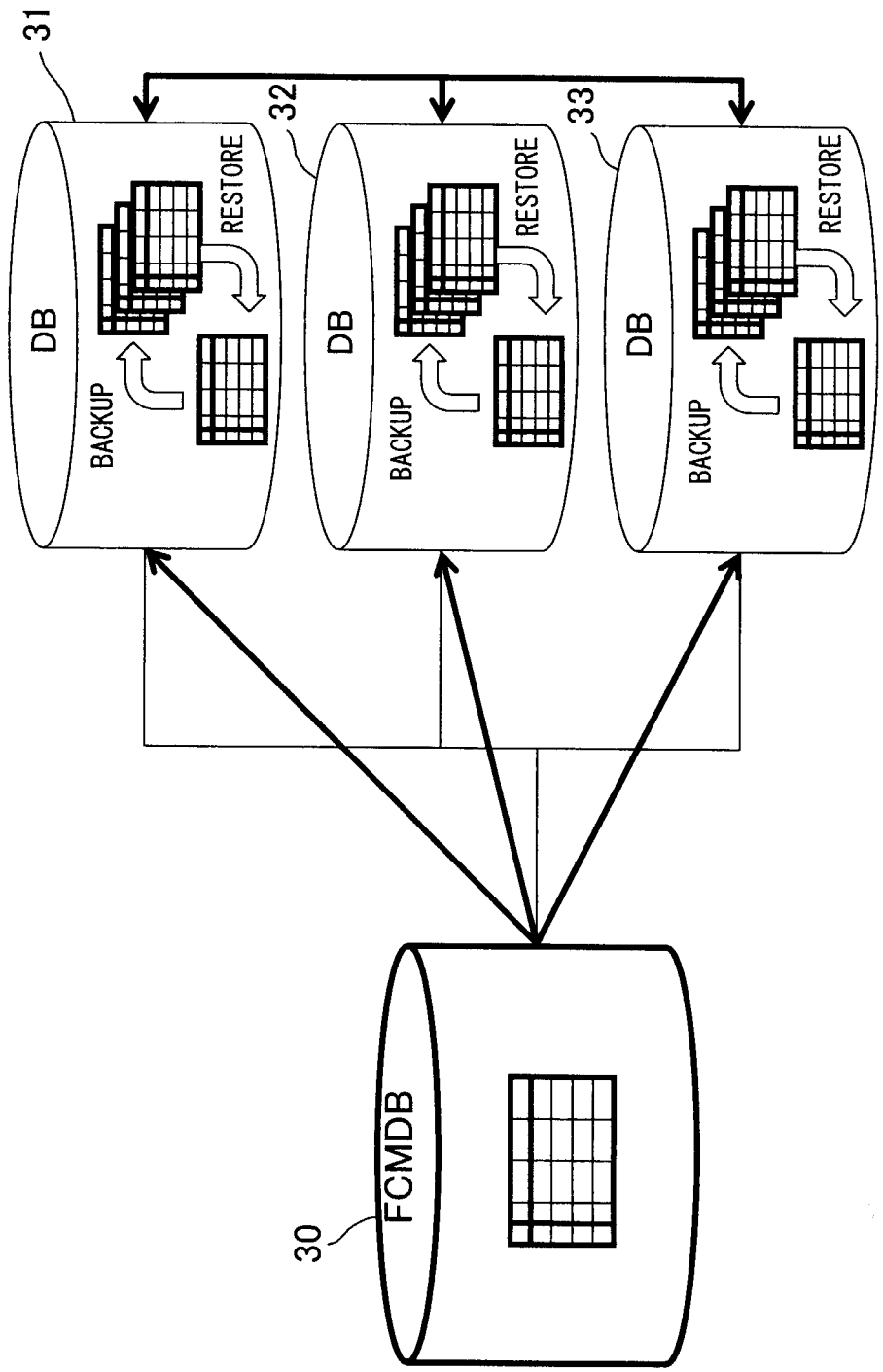
FIG. 3 is a view illustrating a system for management of MDRs by an FCMDB for explaining the backup/restore function in a conventional FCMDB environment (prior art).
Figure 4:
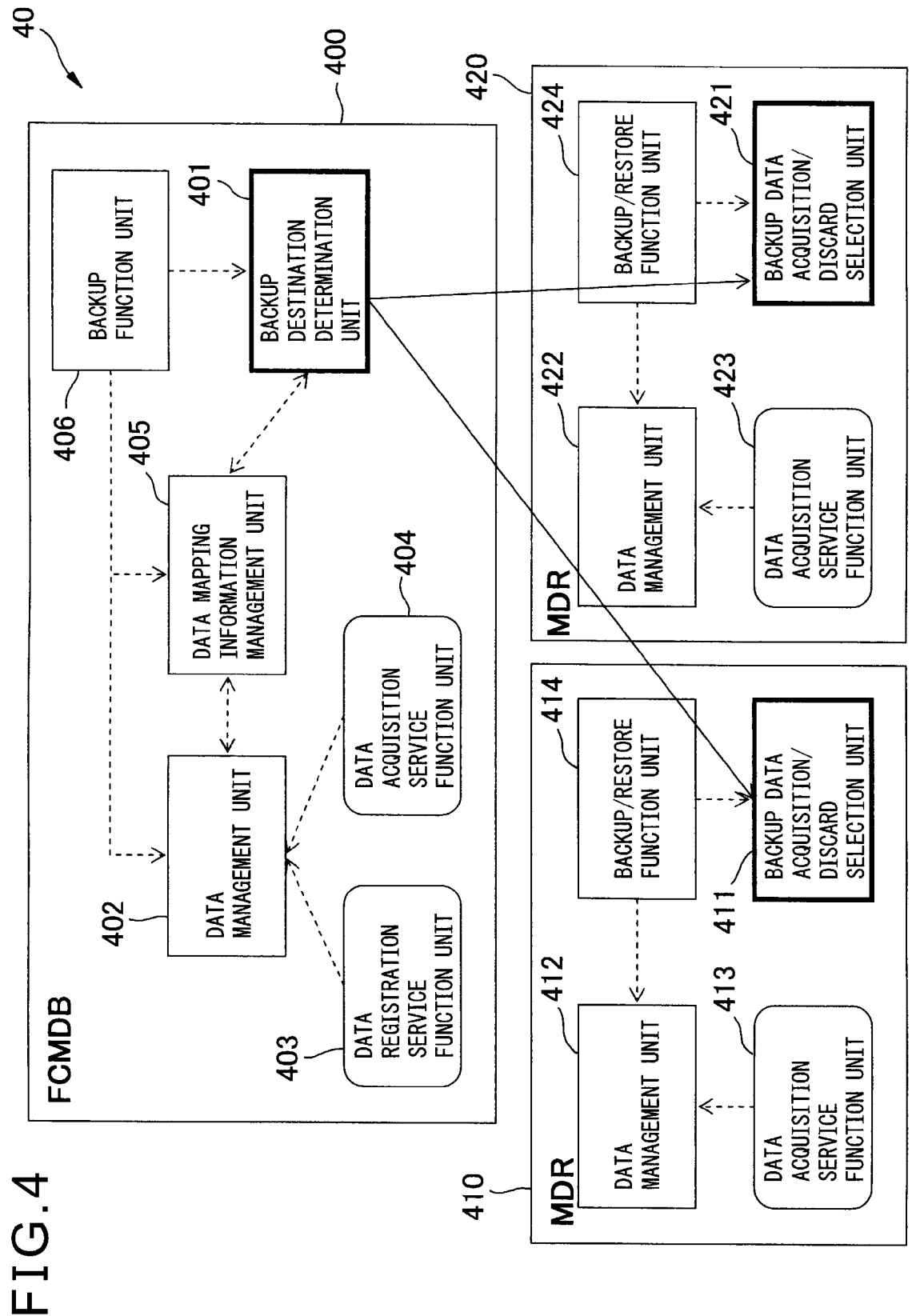
FIG. 4 is a block diagram of the configuration of a first embodiment of the backup data management system under an FCMDB environment.

FIG. 4 is a block diagram illustrating a first embodiment of a backup data management system under an FCMDB environment. The backup data management system 40 according to the embodiment illustrated in FIG. 4 has an FCMDB 400 and a plurality of MDRs 410, 420 managed by the FCMDB 400. Only two MDRs are illustrated in FIG. 4, but the number is not limited to two. The FCMDB 400 has a backup destination determination unit 401, data management unit 402, data registration service function unit 403, data acquisition service function unit 404, data mapping information management unit 405, and backup function unit 406. The MDR 410 and MDR 420 respectively have backup data acquisition/discard selection units 411, 421, data management units 412, 422, data acquisition service function units 413, 423, and backup/restore function units 414, 424.

The backup destination determination unit 401, data management unit 402, data registration service function unit 403, data acquisition service function unit 404, data mapping information management unit 405, and backup function unit 406 in the FCMDB 400 of the present embodiment may be realized by a computer provided with at least a CPU, main memory, and auxiliary memory such as magnetic disk (not shown), but may also be realized instead by the computer of the FCMDB 400 itself. The functions of the units described below are stored in the auxiliary memory, while the processing is run by a program written in the main memory.

The backup data acquisition/discard selection units 411, 421, data management units 412, 422, data acquisition service function units 413, 423, and backup/restore function units 414, 424 in the MDR 410 and MDR 420 of the present embodiment may be respectively realized by a computer provided with at least CPU, main memory, and auxiliary memory such as a magnetic disk, but may also be realized instead by the computers of the MDR 410 and MDR 420 themselves. The functions of the parts described below are stored in the auxiliary memories, while the processings are run by programs written in the main memories while the processings are run by programs written in the main memories as computer-readable media.

The backup data management system (below, simply referred to as a "management system") 40 is communicably connected with not shown managed resources, for example, the server, storage device, switch, or middleware, and has a function of backing up and restoring data relating to these managed resources. A user of management system 40 can back up the data relating to the managed resources by the management system 40 and restore the data from the management system 40.

The backup destination determination unit 401 determines one or more of the plurality of MDRs to store the data to be backed up, that is, the overlapping data relating to the managed resources. Further, Backup destination determination unit 401 sends a message to the backup data acquisition/discard selection units 411, 421 of the MDRs 410, 420 determined as the destinations for storage of the overlapping data to store the overlapping data.

The data management unit 402 operates so as to work with the data mapping information management unit 405 which maps the data for registration or acquisition requested from the data registration service function unit 403 or data acquisition service function unit 404 in the storage destinations of the plurality of MDRs. The backup function unit 406 has the function of operating the backup destination determination unit 401, data management unit 402, and data mapping information management unit 405.

The backup data acquisition/discard selection units 411, 421 receive messages for storage of overlapping data from the backup destination determination unit 401 and determine whether it is necessary for the MDRs to back up the currently held data. When determined necessary, the backup/restore function units 414, 424 perform backup processing.

The data management units 412, 422 store the data requested to be obtained from the data acquisition service function units 413, 423 in their own MDRs by the backup/restore function units 414, 424.

When restoring data from the backup MDRs 410, 420 of the backup data management system 40, by inquiring at the FCMDB 400, a response indicating which of the MDRs 410, 420 is backing up the data is received, so the data can be restored through the FCMDB 400.

Figure 5:
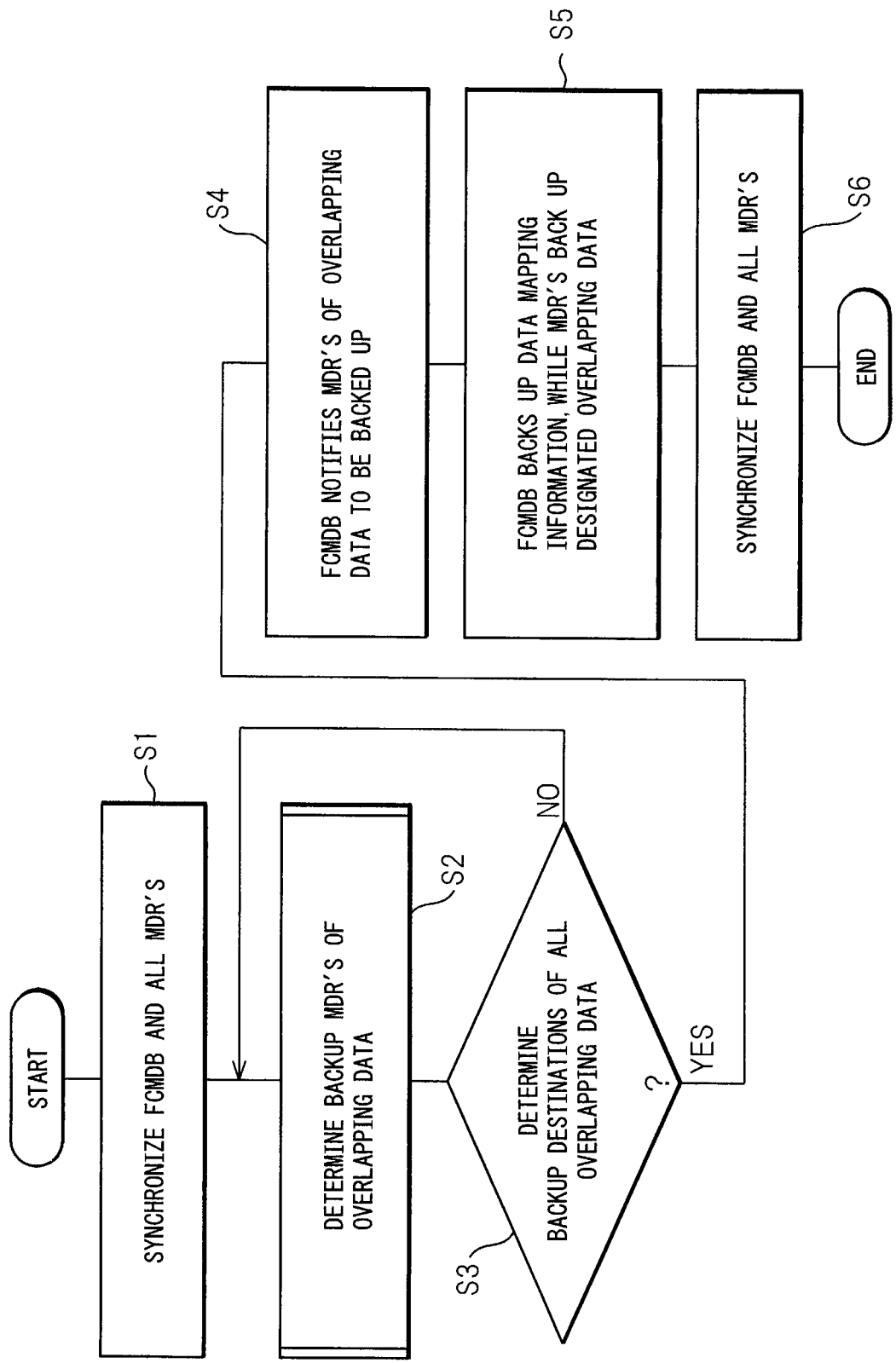
FIG. 5 is a flow chart of processing for backup of the backup data management system illustrated in FIG. 4.

FIG. 5 is a flow chart of the backup processing of the backup data management system illustrated in FIG. 4. The backup processing is performed by the backup function unit 406 and the backup destination determination unit 401. At S1, the backup function unit 406 synchronizes the FCMDB 400 and all MDRs 410, 420. That is, it sets the starting timing of the backup.

At S2, the backup destination determination unit 401 determines the backup MDR 410 or MDR 420 of each overlapping data. At S3, it judges whether the backup destinations for all overlapping data has been determined. When the result of judgment is YES, the routine proceeds to S4, while when NO, the routine returns to S2 after which S2 and S3 are repeated. At S4, the FCMDB 400 notifies the MDRs 410, 420 of the overlapping data to be backed up.

At S5, the FCMDB 400 backs up the data mapping information, that is, information indicating which MDRs to back up the overlapping data by. The backup data acquisition/discard selection units 411, 421 in the MDRs 410, 420 receive notifications from the backup destination determination unit 401 and the backup/restore function units 414, 424 back up the overlapping data designated by the notification. At S6, the FCMDB 400 and all MDRs 410, 420 are synchronized. That is, the timing for end of backup is set.

Figure 6:
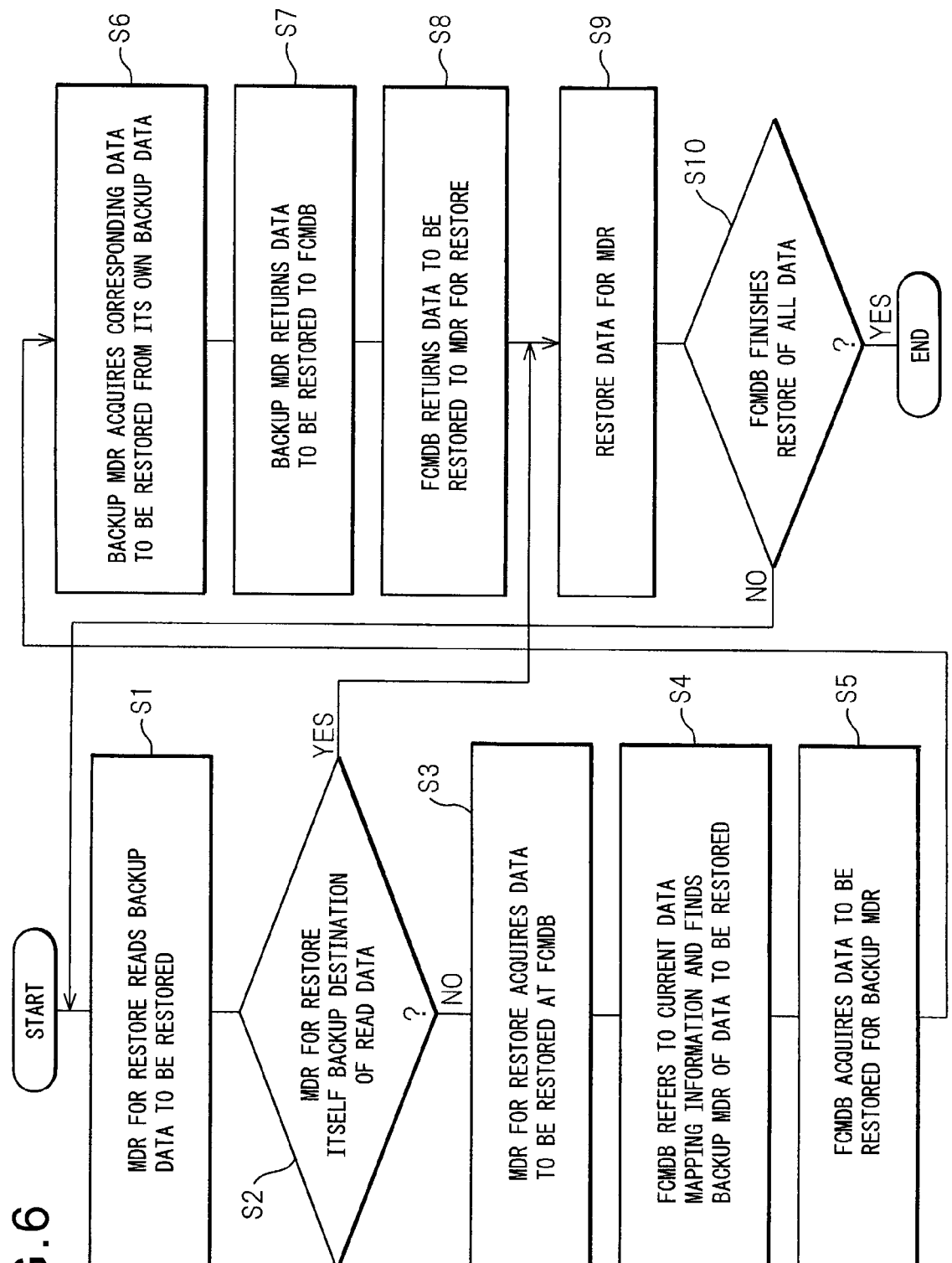
FIG. 6 is a flow chart of processing for backup of the backup data management system illustrated in FIG. 4.

FIG. 6 is a flow chart of the restore processing of the backup data management system illustrated in FIG. 4. The restore processing is performed by the backup function unit 406 executing the following steps S1, S2, S3, S6, S7, S9, and S10. The backup destination determination unit 401 executes the following steps S4, S5, and S8. At S1, the MDR 410 or MDR 420 for restore reads the backup data to be restored.

At S2, the MDR 410 or MDR 420 for restore determines if the read data is its own backup destination data. When the result of determination is YES, the routine proceeds to S9, while when NO, the routine proceeds to S3. At S3, the MDR 410 or MDR 420 for restore acquires the data to be restored at the FCMDB 400.

At S4, the FCMDB 400 refers to the data mapping information of the current point of time and determines the backup MDR 410 or MDR 420 of the data to be restored. At step S5, the FCMDB 400 acquires the data for restore for the backup MDR 410 or MDR 420.

At S6, the backup MDR 410 or MDR 420 acquires the corresponding data to be restored from its own backup data. At S7, the backup MDR 410 or MDR 420 returns the data to the FCMDB 400.

At S8, the FCMDB 400 returns the data to the MDR 410 or MDR 420 for restore. At S9, the MDR 410 or MDR 420 restores the data at its own storage unit. At S10, the FCMDB 400 determines if the restore for all data has been completed. When the determination is YES, the present restore processing is ended, while when NO, the routine returns to S1 whereupon S1 to S10 are repeated.

FIG. 7 is a view illustrating a table storing information of the backup MDRs. At the left and center columns of the table illustrated in FIG. 7, the data mapping information is stored. The backup MDR information is newly added to the data mapping information input at each entry at the right column of the table. At the left column of the table, the "global ID of the item", that is, the name for identifying the managed resource outside of the management system 40, is stored. At the center column of the table, the "MDR holding the data of the item and the local ID" are stored. The local ID means the management ID of the item at the MDR.

Next, the method of determination of the MDRs of the backup destination will be explained. Based on the method of mounting of the FCMDB, the configuration of the MDR, the optimum method of determination is selected from the following methods of determination. The first method of determination is based on the data reconciliation method. Specifically, data of a specific MDR is used as the representative data (first example of determination). For example, when returning the data of the highest priority MDR to the client, the MDR holding the representative data is backed up.

As a modification of the first method of determination, processed data of the MDR is used as the representative data. For example, when returning the average value of the overlapping data to the client, any MDR is determined based on, for example, the following load dispersion algorithm and that MDR backs up the processed data.

The second method of determination tries to equalize the amounts of required resources based on the information of the MDRs so as to disperse the load. According to the second method of determination, by equalizing the amounts of data held by the MDRs, it is possible to lighten the loads of the MDRs with pinched storage capacities. Specifically, the backup MDRs of the overlapping data are dispersed so that the amounts of data which the MDRs back up (including nonoverlapping data as well) become as equal as possible.

The third method of determination tries to equalize the processing times based on the information of the MDRs so as to disperse the load. According to the third method of determination, by selecting the overlapping data backup MDRs in accordance with the environment, it is possible to lighten the loads of the MDRs requiring time for processing for backup/restore. Further, by dispersing the overlapping data backup MDRs in accordance with the environment, it is possible to shorten the time required until completion of backup/restore and performing backup/restore efficiently. Specifically, the backup MDRs are dispersed so that the processing times become as equal as possible with reference to the data dispersion information at the time of past backup processing and the processing time at the MDRs.

In addition, it is also possible to combine at least two methods of determination among the above first to the third methods of determination.

Figure 8:
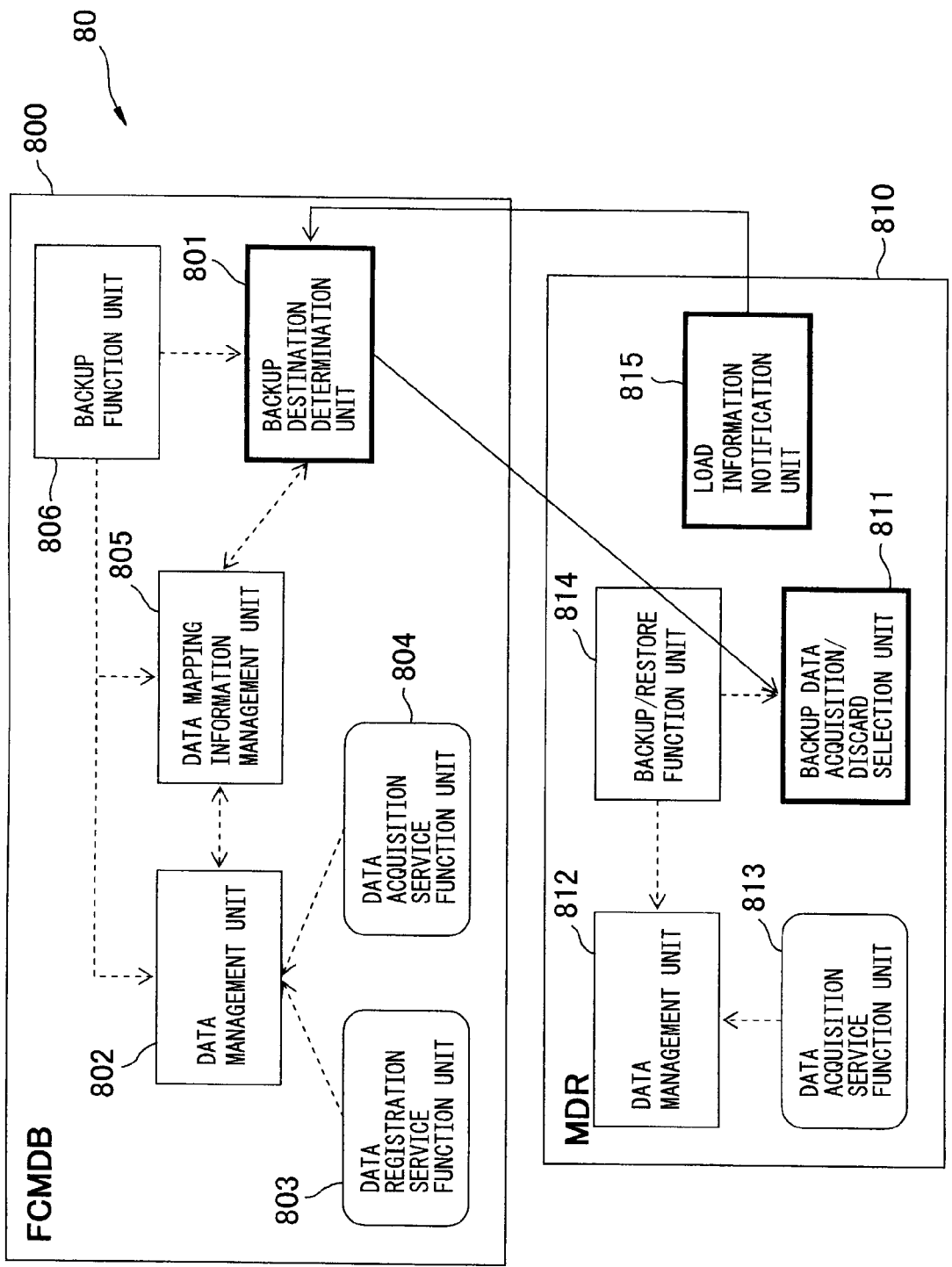
FIG. 8 is a block diagram of the configuration of a second embodiment of the backup data management system under an FCMDB environment.

FIG. 8 is a block diagram of the configuration of a second embodiment of the backup data management system under the FCMDB environment. The backup data management system 80 according to the second embodiment illustrated in FIG. 8 has a FCMDB 800 and a plurality of MDRs which the FCMDB 800 manages. In FIG. 8, for convenience, only the MDR 810 is shown, but there are a plurality of MDRs. The FCMDB 800 has a backup destination determination unit 801, data management unit 802, data registration service function unit 803, data acquisition service function unit 804, data mapping information management unit 805, and backup function unit 806. The MDR 810 has a backup data acquisition/discard selection unit 811, data management unit 812, data acquisition service function unit 813, backup/restore function unit 814, and load information notification unit 815.

In FIG. 8, the units other than the load information notification unit 815 have the same functions as the units illustrated in FIG. 4, so explanations will be omitted. The load information notification unit 815 has the function of acquiring the load information such as the free disk space and the previous backup processing time and notifying it to the backup destination determination unit 801 in the FCMDB 800. Note that, the load information notification unit 815 may also be realized by a computer provided with at least a not shown CPU, main memory, and auxiliary memory (magnetic disk), but is instead realized by the computer of the MDR 810 itself. The functions of the units described below are stored in the auxiliary memory, while the processing is performed by a program written in the main memory.

Figure 9:
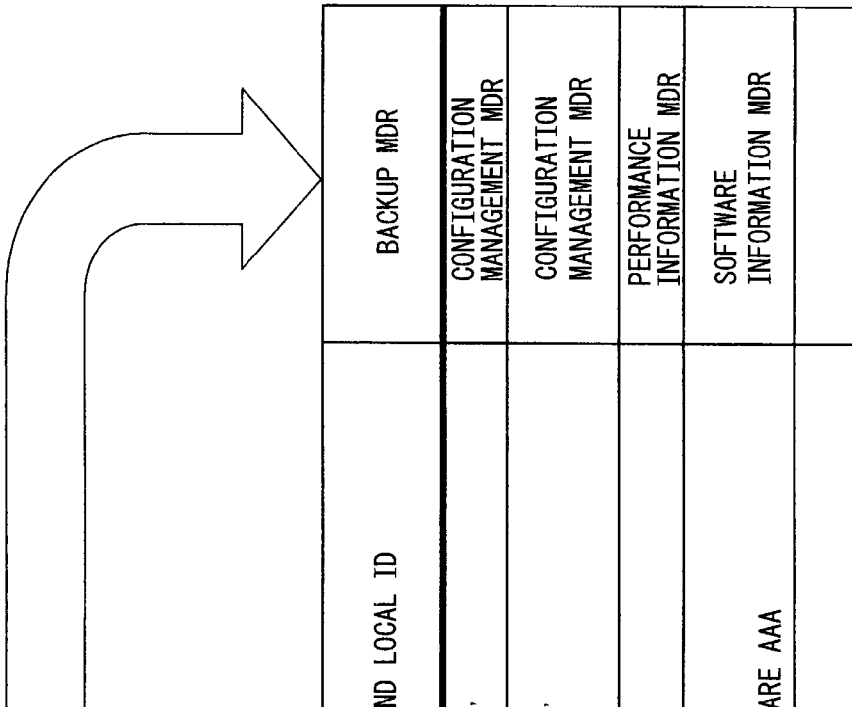
FIG. 9 is a view illustrating a first example of determination of backup MDRs.

FIG. 9 is a view illustrating a first example of determination of the backup MDR. The table illustrated at the top of FIG. 9 is provided in the FCMDB 800. The "data type" of the left column stores the names of the managed resources of the management system 80 such as the server, switch, middleware, etc. The "priority of MDRs" of the right column of the table at the top of FIG. 9 stores priority degrees designating at which MDRs the information of the managed resources is to be backed up at with priority. The table shown at the bottom of FIG. 9 is the same as the table illustrated in FIG. 7 and is provided in the MDR 810. The backup MDRs are determined in accordance with the "priority of MDRs".

Figure 10:
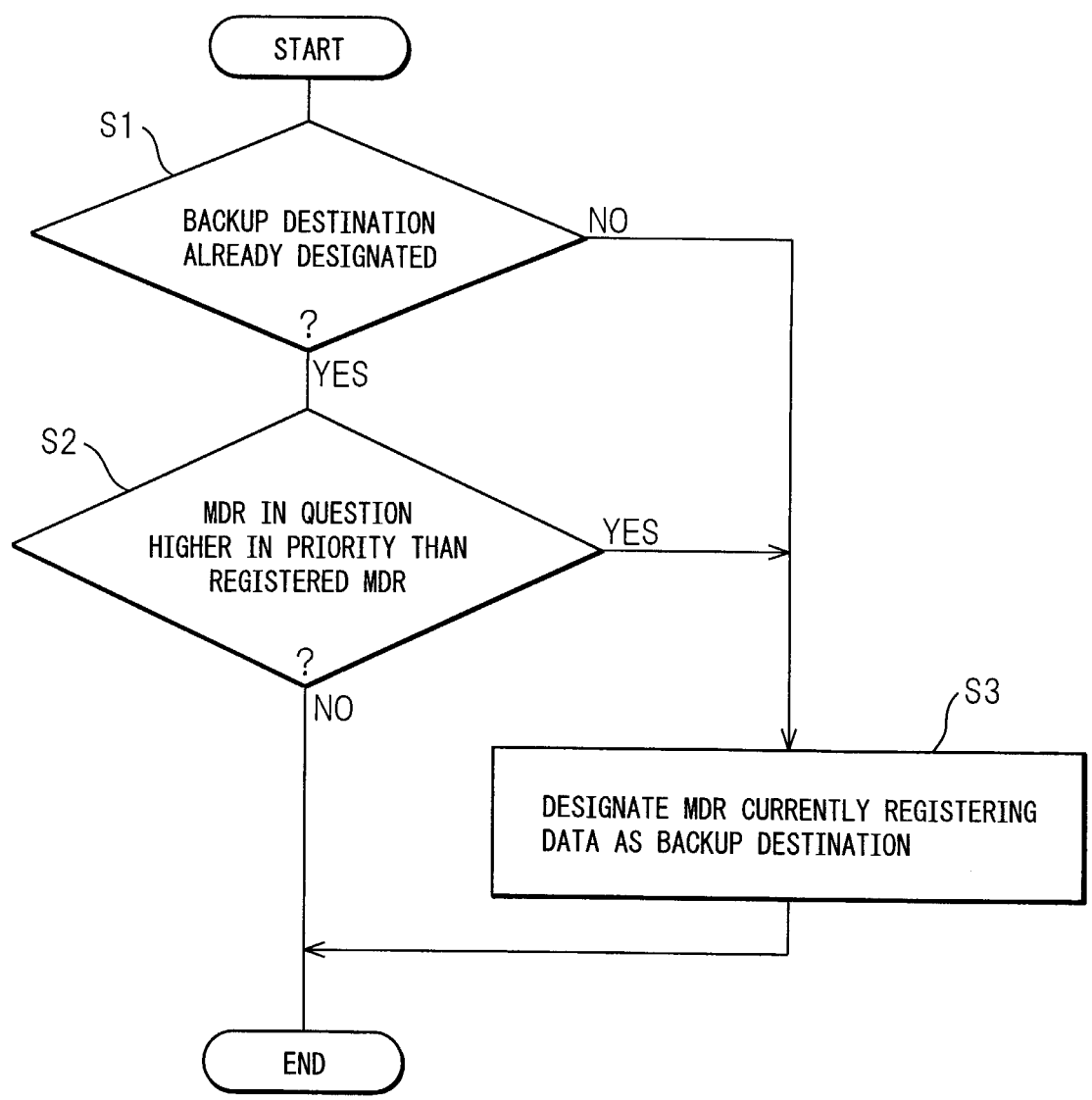
FIG. 10 is a flow chart of a first method of determination of backup MDRs.

FIG. 10 is a flowchart of the first method of determination of backup MDRs. At S1, it is determined if a backup destination is already designated. When the determination is YES, the routine proceeds to S2, while when the determination is NO, the routine proceeds to S3. At S2, it is determined if the MDR is higher in priority than a registered MDR. When the determination is YES, the routine proceeds to step S3, while when the determination NO, the routine ends. At S3, the MDR currently registering the data is designated as the backup destination.

Figure 11:
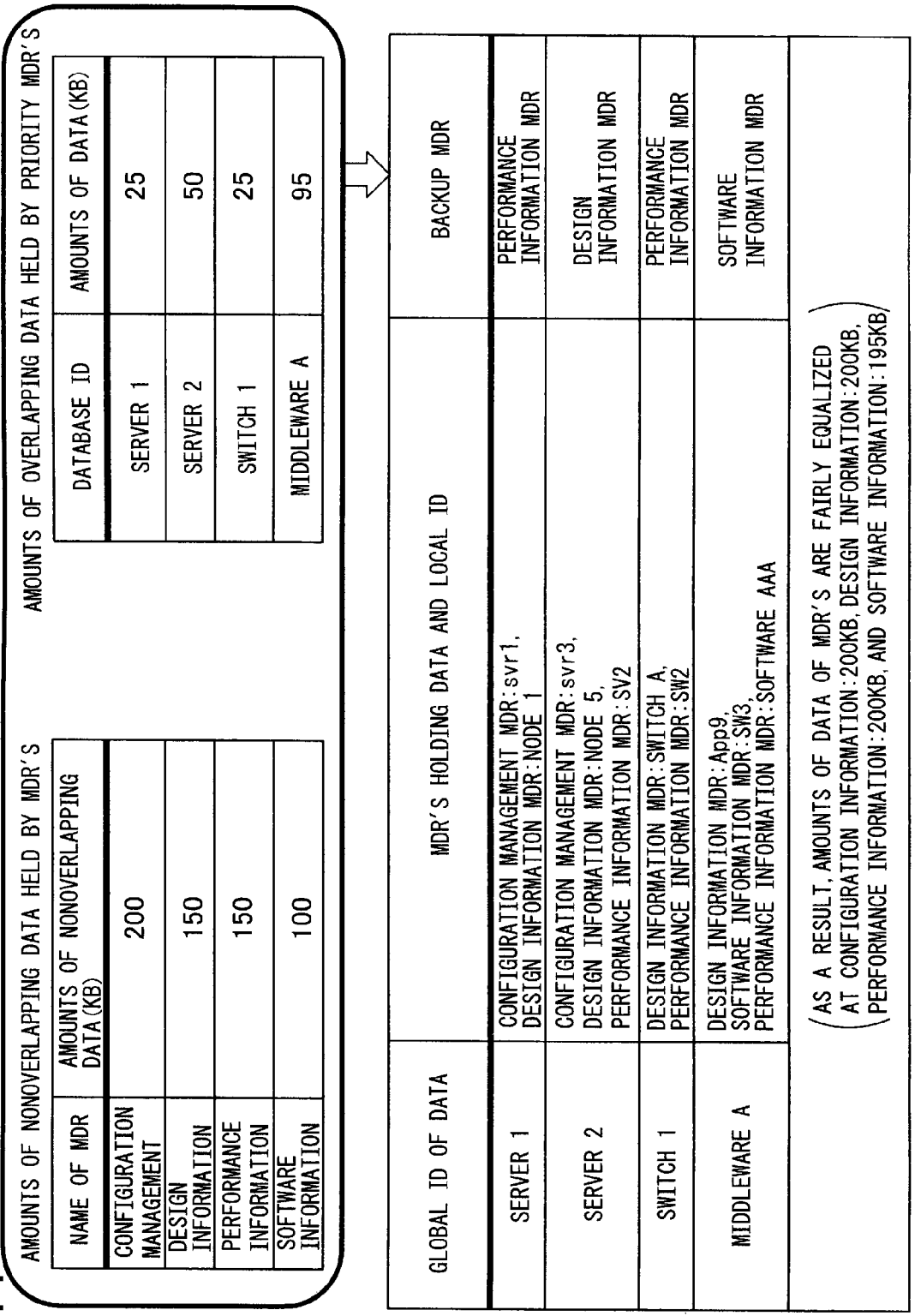
FIG. 11 is a view illustrating a second example of determination of backup MDRs.

FIG. 11 is a view illustrating a second example of the determination of backup MDRs. The tables illustrated at the top of FIG. 11 show the amounts of nonoverlapping data held by the MDRs (left table) and the amounts of overlapping data held by the priority MDRs (right table). The left table is provided with columns storing the names of the MDRs and the amounts of nonoverlapping data held by the MDRs. The right table is provided with columns storing the IDs of items which the plurality of MDRs hold overlappingly and their amounts of data.

The table shown at the bottom of FIG. 11 is the same as the table shown at the bottom of FIG. 9 and is provided in the MDR 810. The backup MDRs are determined so that the "amounts of overlapping data held by the MDRs" are dispersed equally at the MDRs.

Figure 12:
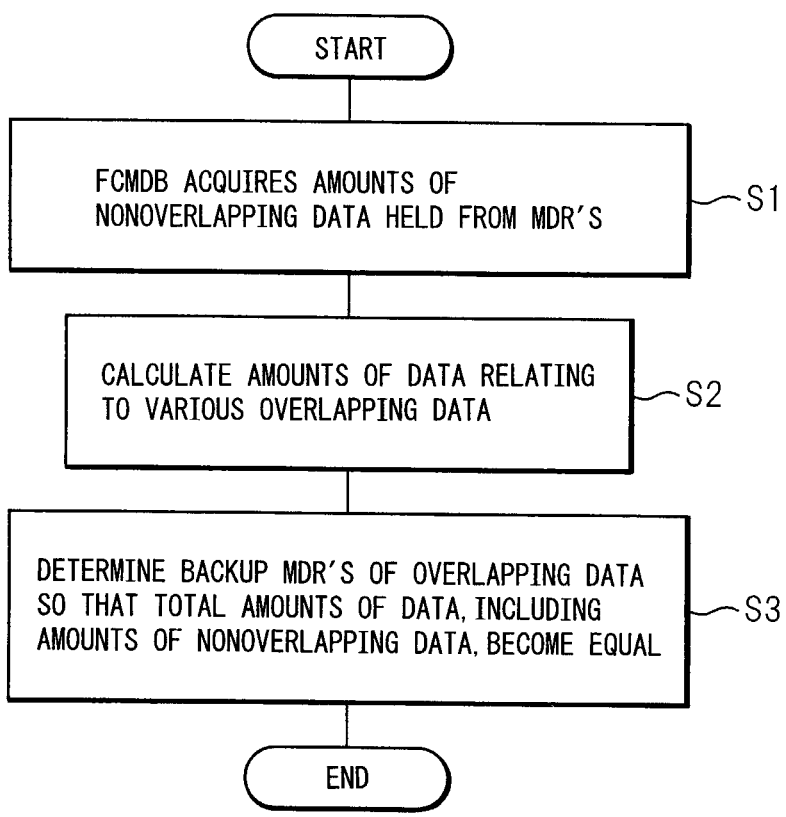
FIG. 12 is a flow chart of a second method of determination of backup MDRs.

FIG. 12 is a flow chart of a second method of determination of backup MDRs. The processing for determination of the backup MDRs illustrated by the flow chart of FIG. 12 is executed by the FCMDB 800. At S1, the FCMDB 800 acquires the amounts of nonoverlapping data held by the MDRs 810 from the MDRs 810.

At S2, the amounts of data are calculated for the overlapping data (see table at top right of FIG. 11). At S3, the backup MDRs of the overlapping data are determined so that the total amounts of data, including the amounts of nonoverlapping data, become equal. Specifically, various combinations of the backup MDRs are created and the combination dispersing the data most evenly to the MDRs is selected.

FIG. 13 is a view illustrating a third method of determination of backup MDRs. The table illustrated at the top left of FIG. 13 includes a column of the amounts of nonoverlapping data illustrated in the table illustrated at the top left of FIG. 11. Further, the top left table of FIG. 13 includes columns of the amounts of overlapping data, the processing time, and the processing performance. The table illustrated at the top left of FIG. 13 shows the state at the time of acquiring the previous backup. The table illustrated at the bottom left of FIG. 13 is the same as the table illustrated at the bottom of FIG. 11 and is provided in the MDR 810.

The table illustrated at the top right of FIG. 13 is provided with columns of the "amounts of nonoverlapping data" and "estimates of processing time" of the MDRs currently backing up the data. At the bottom right of FIG. 13, columns illustrating the IDs of the items which the plurality of MDRs currently backing up the data hold overlappingly and the amounts of data of the same are provided. The backup MDRs are determined so that the load is dispersed equally based on the "amounts of overlapping data held by the MDRs and the data processing time" of the MDRs currently backing up the data.

FIG. 14 is a flow chart of a third method of determination of backup MDRs. At S1, the FCMDB 800 acquires from the MDRs 810 the amounts of nonoverlapping data held, the amounts of overlapping data previously backed up, and the previous backup processing time.

At S2, the amount of data processing per unit time is found for each MDR based on the previous backup processing time and the total amount of data (overlapping data and nonoverlapping data). At S3, the time required for backing up the nonoverlapping data is estimated for each MDR based on the amount of data processing per unit time found at S2.

At S4, based on the backup processing time (estimated) of the nonoverlapping data and considering the amount of data processing per unit time, the backup MDRs of the overlapping data are determined so that the overall processing times become equal.

It is sufficient to hold overlapping data at only specific MDRs, so it is possible to reduce the storage capacity required at the plurality of MDRs as a whole in the FCMDB environment.

Further, by selecting the overlapping data backup MDRs in accordance with the environment, it is possible to lighten the load on MDRs with pinched empty storage capacities and little remaining space or on MDRs taking time for backup/restore processing.

Further, by dispersing the overlapping data backup MDRs in accordance with the environment, it is possible to shorten the time required until completion of backup/restore and efficiently perform backup/restore.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed:

1. A management device that manages a plurality of storage devices, comprising:
    a specifying unit that obtains information relating to data stored in the plurality of storage devices, and specifies data overlappingly stored in the storage devices and the storage devices storing the overlapping data based on the relating information; and
    a determining unit that selects any one of the specified storage devices as a backup destination storage device that backs up the overlapping data, and causes the selected storage device to back up the overlapping data in the selected storage device within the selected storage device.

2. The management device according to claim 1, wherein the backup destination storage device that backs up the overlapping data is selected based on a priority order set for configuration information of the management device.

3. The management device according to claim 1, wherein the backup destination storage device that backs up the overlapping data is selected based on information at the time of backup or restore.

4. The management device according to claim 1, wherein the backup destination storage device that backs up the overlapping data is selected so that the amounts of data held by each of the storage devices become equal.

5. The management device according to claim 1, wherein the determining unit obtains amount of free space and a previous backup processing time from each of the storage devices.

6. The management device according to claim 1, wherein the management device holds information associating the overlapping data with the backup destination storage device storing the overlapping data.

7. The management device according to claim 6, wherein the determining unit obtains the overlapping data from the backup destination storage device that is associated with the overlapping data according to the associating information.

8. A management method that manages a plurality of storage devices, comprising:
    obtaining information relating to data stored in the plurality of storage devices, and specifying data overlappingly stored in the storage devices and the storage devices storing the overlapping data based on the relating information; and selecting any one of the specified storage devices as a backup destination storage device that backs up the overlapping data, and causing the selected storage device to back up the overlapping data in the selected storage device within the selected storage device.

* * * * *